US012650566B2

(12) United States Patent (10) Patent No.: US 12,650,566 B2

Ding et al. (45) Date of Patent: Jun. 9, 2026

(54) SERVICE BOARD AND COMMUNICATION DEVICE

(71) Applicant: HUAWEI TECHNOLOGIES CO., LTD., Shenzhen (CN)

(72) Inventors: Libin Ding, Dongguan (CN); Hang Yan, Shanghai (CN); Wenxue Zhu, Dongguan (CN); Yang Liu, Dongguan (CN); Xiang Guo, Dongguan (CN); Wenliang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/471,352

(22) Filed: Sep. 21, 2023

(65) Prior Publication Data

US 2024/0012214 A1 Jan. 11, 2024

Related U.S. Application Data

(63) Continuation of application No. PCT/CN2022/079878, filed on Mar. 9, 2022.

(30) Foreign Application Priority Data

Mar. 25, 2021 (CN) .......................... 202110319527.0

(51) Int. Cl.
*G02B 6/42* (2006.01)

(52) U.S. Cl.
CPC ......... *G02B 6/4278* (2013.01); *G02B 6/4281* (2013.01)

(58) Field of Classification Search
CPC .. G02B 6/4278; G02B 6/4281; G02B 6/4284; H05K 1/147; H05K 1/181;
(Continued)

(56) References Cited

U.S. PATENT DOCUMENTS 6,507,588 B1 * 1/2003 Yasuda .............. H04Q 11/0471
379/93.05
8,215,965 B2 * 7/2012 Mizoguchi ............. H05K 3/326
361/760
(Continued)

FOREIGN PATENT DOCUMENTS

EP 2341583 A1 7/2011
WO 2008122005 A2 10/2008

OTHER PUBLICATIONS

QSFP DD800 Specification QSFP-DD specification for 800G operation Rev 1.0 Mar. 6, 2020 3.6, total 20 pages.
(Continued)

*Primary Examiner* — Abdullah A Riyami
*Assistant Examiner* — Thang H Nguyen

(57) ABSTRACT

A service board includes a flexible board, at least one chip, and at least one optical cage layer. Each optical cage layer includes a plurality of optical cages. Each optical cage has an opening that faces a panel side and that is configured to connect to an optical module. The optical cage includes a housing and a plurality of signal pins. One end of the flexible board is electrically connected to tail ends of the plurality of signal pins, and another end of the flexible board is electrically connected to one chip, thereby shortening a connection path between the optical module and the chip, and reducing a link loss. Therefore, integration of the service board is improved, assembly is convenient, and a high-density connection and a simplified design of the service board are implemented, so that the service board is applicable to a high-density and high-speed transmission scenario.

20 Claims, 8 Drawing Sheets

(58) Field of Classification Search
CPC . H05K 2201/0367; H05K 2201/10121; H05K
2201/10265; H05K 3/365
See application file for complete search history.

(56)                 References Cited

U.S. PATENT DOCUMENTS

| | | | | |
|---|---|---|---|---|
| 10,018,794 | B2 * | 7/2018 | Sun | G02B 6/4206 |
| 11,705,653 | B2 * | 7/2023 | Obata | H01R 12/778 |
| | | | | 439/492 |
| 2012/0307986 | A1 * | 12/2012 | Lu | H04L 49/60 |
| | | | | 379/90.01 |
| 2014/0113484 | A1 * | 4/2014 | Chen | H01R 12/79 |
| | | | | 439/492 |
| 2017/0310363 | A1 * | 10/2017 | Liu | H05K 7/1492 |
| 2021/0333492 | A1 * | 10/2021 | Nakao | H05K 1/189 |
| 2022/0357535 | A1 * | 11/2022 | Suzuki | H05K 1/0274 |
| 2023/0110836 | A1 * | 4/2023 | Stauffer | H01R 12/67 |
| | | | | 439/492 |

OTHER PUBLICATIONS

Extended European Search Report dated Jul. 2, 2024, Issued for
European Application No. 22774043.8 (6 pages).

* cited by examiner 31    13    10

32

31

14    10

SERVICE BOARD AND COMMUNICATION DEVICE

CROSS-REFERENCE TO RELATED APPLICATIONS

This application is a continuation of International Application No. PCT/CN2022/079878, filed on Mar. 9, 2022, which claims priority to Chinese Patent Application No. 202110319527.0, filed on Mar. 25, 2021. The disclosures of the aforementioned applications are hereby incorporated by reference in their entireties.

TECHNICAL FIELD

This disclosure relates to the field of communication technologies, and in particular, to a service board and a communication device.

BACKGROUND

An optical communication technology has become a low-cost and batch productization technology, and is widely applied to applications including switch interconnection, a server interface, and the like. In the application of the optical communication technology, a pluggable optical module needs to be used to connect an optical cable that carries data to a network communication device such as a switch.

Currently, a service board is disposed in a network communication device such as a switch or a base station. The service board includes a printed circuit board (PCB), and a chip and an optical cage that are disposed on the printed circuit board. The optical cage is located at an edge of the printed circuit board, the optical cage is electrically connected to the chip, and the optical module is disposed on an interface of the optical cage in a pluggable manner, so that a signal connection is implemented between the optical module and the chip. Specifically, a cable may be led out from a back side of the optical cage, and the optical cage may be connected to a chip side by using the cable, for example, connected by using a connector on the chip side through crimping, or connected by using a spring contact, so that an electrical connection between the optical cage and the chip is implemented, and an electrical connection between the optical module and the chip is implemented.

However, when interfaces on an optical cage side are dense, a large quantity of cables are led out, integration is poor, and assembly is complex. In addition, when a connection is performed on the chip side, there are problems including a large bending radius, weight, volume, occupied space, and wind resistance, and the like. As a result, a size of the service board is large and performance is reduced, and application of the service board in a high-speed high-density scenario is restricted.

SUMMARY

This disclosure provides a service board and a communication device, to resolve a problem that an existing service board is not applicable to a high-speed high-density transmission scenario because of poor integration of the service board and a large weight, volume, occupied space, wind resistance, and the like when interfaces on an optical cage side on the service board are dense.

A first aspect of this disclosure provides a service board, including a first printed board, at least one chip, and at least one optical cage layer, where each optical cage layer includes a plurality of optical cages, each optical cage has an opening facing a panel side, and the opening is configured for insertion of one optical module; and the service board further includes a flexible board, the optical cage includes a housing and a plurality of signal pins, one end of the flexible board is electrically connected to tail ends of the plurality of signal pins, another end of the flexible board is electrically connected to one chip, and the tail ends of the plurality of signal pins are ends that are of the plurality of signal pins and that are away from the opening of the optical cage. In this way, an electrical connection between the chip and the optical cage can be implemented by using the flexible board, that is, an electrical connection between the chip and the optical module is implemented, so that a signal may be transmitted from the optical module to the chip of the service board, to implement signal transmission and processing.

The tail ends of the plurality of signal pins of the optical cage are directly connected to a chip side of the flexible board to implement an electrical connection. Compared with an existing optical cage that is electrically connected to a printed circuit board on a chip side by using a connector, a vertical connection path can be avoided, a link length can be shortened, an insertion loss and crosstalk can be reduced, and the service board is more applicable to a high-speed transmission scenario.

In addition, the flexible board has high wiring density, a soft overall structure feature, and good bending performance, and can be bent and twisted at an arbitrary angle. Therefore, a non-coplanar connection between a plurality of layers of optical cages and the chip is implemented, integration of the service board is improved, assembly is convenient, introduction of problems including a large matching height, volume, and occupied space, and the like is reduced, a link insertion loss and crosstalk are reduced, and a high-density connection and a simplified design of the service board are implemented, so that the service board can be better applicable to a high-density high-speed transmission scenario.

In a possible implementation, the tail ends of the plurality of signal pins all extend from a tail end of the housing, and a tail end of each signal pin in the plurality of signal pins is a first bump structure.

The flexible board may have a connection part, and a plurality of second bump structures may be disposed on a plate surface of the connection part. The plurality of second bump structures may be in contact with a plurality of corresponding first bump structures, and an electrical connection is implemented, so that an electrical connection between the flexible board and the optical cage is implemented. A connection manner is simple and easy to implement.

In a possible implementation, the tail ends of the plurality of signal pins all extend from a tail end of the housing, and a tail end of each signal pin in the plurality of signal pins is a spring contact structure. The spring contact structure is in contact with the second bump structure on the connection part of the flexible board, and an electrical connection is implemented, so that an electrical connection between the flexible board and the optical cage is implemented.

Because the spring contact structure is elastic, the spring contact structure may be compressed to generate elastic deformation. When the second bump structure abuts against and is electrically connected to the spring contact structure, the second bump structure may press the spring contact structure, to make the spring contact structure in an elastic contracting state. The contracted spring contact structure has an elastic recovery force that may react on the second bump structure, to make contact between the spring contact structure and the second bump structure more secure, so that reliability of an electrical connection between the spring contact structure and the second bump structure is improved, reliability of an electrical connection between the optical cage and the flexible board is ensured, and stability and quality of signal transmission are improved.

In a possible implementation, the tail ends of the plurality of signal pins all extend from the tail end of the housing, a tail end of each signal pin in the plurality of signal pins is an elastic pin, the elastic pin is in contact with the second bump structure on the connection part of the flexible board, and an electrical connection is implemented, so that an electrical connection between the flexible board and the optical cage is implemented.

The elastic pin is an elastic component having a spring, and may be elastically deformed. When the second bump structure abuts against and is in contact with the elastic pin, the elastic pin may be pushed to generate elastic compression, and an elastic recovery force of the elastic pin may react on the second bump structure, so that reliability of an electrical connection between the second bump structure and the elastic pin is ensured, and reliability of an electrical connection between the optical cage and the flexible board is ensured.

In a possible implementation, the flexible board has a connection part, a first surface of the connection part faces the tail end of the housing, a plurality of second bump structures are disposed on a plate surface of the connection part, the plurality of second bump structures are in contact with corresponding tail ends of the plurality of signal pins, and an electrical connection is implemented.

In this way, the flexible board is in contact with the tail ends of the plurality of signal pins of the optical cage by using the second bump structure on the connection part of the flexible board, and an electrical connection is implemented, that is, the electrical connection is implemented in a butt contact manner. This manner has high detachability, is easy to implement decoupling between the optical cage and the flexible board, and is convenient for assembly, disassembly, and replacement.

In a possible implementation, the tail ends of the plurality of signal pins all extend from a tail end of the housing, and a tail end of each signal pin in the plurality of signal pins is a fisheye structure, that is, the tail end of the signal pin is electrically connected to the flexible board by using the fisheye structure.

In a possible implementation, the flexible board has a connection part, a first surface of the connection part faces a tail end of the housing, a plurality of signal via holes are disposed on a plate surface of the connection part, and the plurality of fisheye structures are pressed into the plurality of signal via holes in a one-to-one correspondence manner. In this way, the fisheye structure abuts against and is in contact with the signal via hole, and an electrical connection between the fisheye structure and the signal via hole is implemented, so that an electrical connection between the flexible board and the optical cage is implemented.

However, because the fisheye structure has an elastic crimping ring, when the fisheye structure is pressed into the plurality of signal via holes in a one-to-one correspondence manner, the elastic crimping ring is in an elastic contracting state, and an elastic recovery force of the elastic crimping ring reacts on the signal via hole, so that the elastic crimping ring is clamped in the signal via hole, and reliability of an electrical connection between the flexible board and the optical cage is ensured.

In a possible implementation, the tail ends of the plurality of signal pins all extend from a tail end of the housing, the plurality of signal pins include a first signal pin array and a second signal pin array, the first signal pin array is configured to send a signal to the chip, and the second signal pin array is configured to receive a signal from the chip.

In a possible implementation, a reinforcing structure is disposed on a second surface of the connection part, and the second surface is away from the first surface. Strength of the flexible board can be improved by using the reinforcing structure, to ensure fastness of an electrical contact connection between the flexible board and the optical cage after the flexible board is fixedly connected to the optical cage, and improve stability and quality of signal transmission.

In a possible implementation, a locking structure is further included, where the locking structure is configured to fasten the connection part and a corresponding tail end of the housing. In this way, the flexible board and the housing of the optical cage are fastened by using the locking structure.

In a possible implementation, a locking structure is further included, where the locking structure is configured to fasten the connection part, the reinforcing structure, and a corresponding tail end of the housing.

In a possible implementation, the tail ends of the plurality of signal pins are all located inside the housing, and the flexible board extends into the housing from a tail end of the housing and is electrically connected to the tail ends of the plurality of signal pins. In this way, an electrical connection between the flexible board and the optical cage is implemented. In this way, the flexible board and the optical cage have better connection fastness, strength of an electrical connection between the flexible board and the optical cage is increased, connection reliability is improved, and signal transmission stability and quality are improved. In addition, a path between the signal pin and the flexible board may be further shortened, and a link loss and crosstalk may be further reduced.

In a possible implementation, the at least one chip is disposed on the first printed board and is electrically connected to the first printed board, at least one flexible board is disposed on the first printed board, the at least one flexible board is fastened to the first printed board by using a combination part, and the at least one chip and the at least one flexible board are both located on a same side of the first printed board, or are respectively located on two sides of the first printed board; and when the at least one flexible board includes only one flexible board, the combination part is a part of the flexible board, and the flexible board is electrically connected to the first printed board; or when the at least one flexible board includes a plurality of flexible boards, the combination part includes a part of each flexible board in the plurality of flexible boards, and the combination part is electrically connected to the first printed board.

In this way, the flexible board is electrically connected to the first printed board, and the first printed board is electrically connected to the chip, so that an electrical connection between the flexible board and the chip is implemented, and an electrical connection between the optical cage and the chip is implemented by using the flexible board.

In a possible implementation, the at least one chip is disposed on the first printed board and is electrically connected to the first printed board, and at least one flexible board is disposed on the first printed board; and the first printed board includes a flexible and rigid combination area, a part of the first printed board and a part of the at least one flexible board are laminated to form the flexible and rigid combination area, and the at least one flexible board is electrically connected to the first printed board. In this way, the flexible and rigid combination area is formed through mixed pressing, so that fastening and an electrical connection between the at least one flexible board and the first printed board are implemented, connection fastness between the flexible board and the first printed board is ensured, and stability and quality of signal transmission are improved.

In a possible implementation, the at least one chip includes at least one chip component and a second printed board electrically connected to the at least one chip component, the second printed board is disposed on the first printed board, at least one flexible board is disposed on the second printed board, the at least one flexible board is fastened to the second printed board by using a combination part, and both the chip component and the at least one flexible board are located on a same side of the second printed board; and when the at least one flexible board includes only one flexible board, the combination part is a part of the flexible board, and the flexible board is electrically connected to the second printed board; or when the at least one flexible board includes a plurality of flexible boards, the combination part includes a part of each flexible board in the plurality of flexible boards, and the combination part is electrically connected to the second printed board.

In this way, the flexible board is in a direct electrical connection to the second printed board of the chip. Compared with implementing an electrical connection to the chip by using the first printed board, this can further reduce a link loss and crosstalk, and help improve performance of the service board.

In a possible implementation, the at least one chip includes at least one chip component and a second printed board electrically connected to the at least one chip component, the second printed board is disposed on the first printed board, and at least one flexible board is disposed on the second printed board; and the second printed board includes a flexible and rigid combination area, a part of the second printed board and a part of the at least one flexible board are laminated to form the flexible and rigid combination area, and the at least one flexible board is electrically connected to the second printed board.

In this way, the flexible and rigid combination area is formed through mixed pressing, so that fastening and an electrical connection between the at least one flexible board and the second printed board are implemented, connection fastness between the flexible board and the second printed board is ensured, and stability and quality of signal transmission are improved.

A second aspect of this disclosure provides a communication device, including a body and the service board according to any one of the foregoing items, where the body has a slot, and the service board is inserted into the slot.

In this way, the service board is included, and the service board implements an electrical connection between a chip and an optical cage by using a flexible board, so that a connection path can be shortened, and an insertion loss and crosstalk can be reduced. In addition, the flexible board has good bending performance and high wiring density, can be bent and twisted arbitrarily, and occupies small space. Therefore, a non-coplanar connection between a plurality of layers of optical cages and the chip is implemented, integration of the service board is improved, assembly is convenient, introduction of problems including a large matching height, volume, and occupied space, and the like is reduced, a high-density connection and a simplified design of the service board are implemented, reduction of occupied space of the communication device is facilitated, and the communication device is applicable to high-speed and high-density signal transmission.

DESCRIPTION OF REFERENCE NUMERALS

1: communication device; 100: service board; 10: flexible board;

10a: first bump array; 10b: second bump array; 11: connection part;

111: second bump structure; 12: mounting hole; 13: combination part;

14: flexible and rigid combination area; reinforcing structure 15; 20: first printed board; 30: chip;

31: chip component; 32: second printed board; 40: optical cage;

40a: first signal pin array; 40b: second signal pin array; 41: housing;

411: opening; 42: signal pin; 43: first bump structure;

44: spring contact structure; 441: body end; 442: bent end;

45: elastic pin; 451: outer tube; 452: inner tube;

46: fisheye structure; 461: insertion end; 462: connection end;

463: elastic crimping ring; 200: optical module; 300: body.

DESCRIPTION OF EMBODIMENTS

Terms used in implementations of this disclosure are only used to explain specific embodiments of this disclosure, but are not intended to limit this disclosure.

Embodiments of this disclosure provide a service board and a communication device. The communication device may be any communication device that needs to be connected to an optical module including a switch, a router, a network transport device, a broadband access device, or the like.

Figure 1:
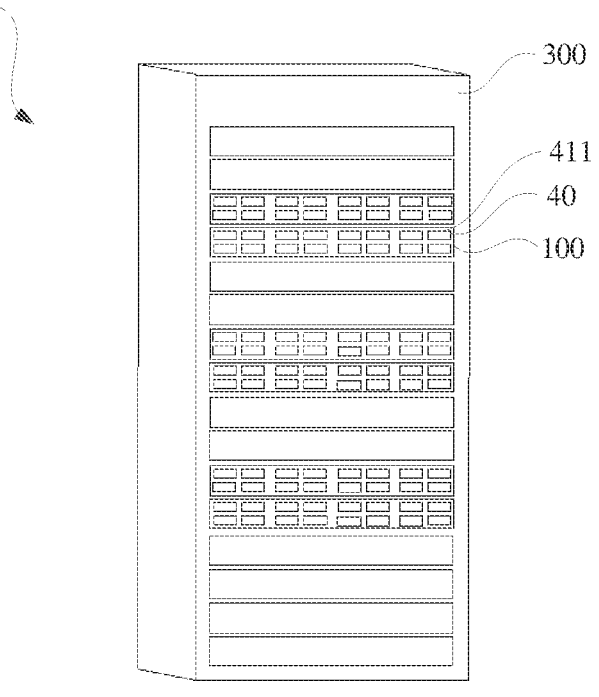
FIG. 1 is a schematic diagram of a structure of a communication device according to an embodiment of this disclosure.

As shown in FIG. 1, a communication device 1 may include a body 300 and a service board 100. Specifically, the body 300 may have several slots, and the service board 100 may be inserted into the slot. The body 300 may have a plurality of slots, each slot may accommodate one service board 100, each service board 100 may have at least one optical cage layer, each optical cage layer may include a plurality of optical cages 40, each optical cage 40 has an opening 411 facing a panel side, and the opening 411 is configured for insertion of one optical module 200.

Figure 2:
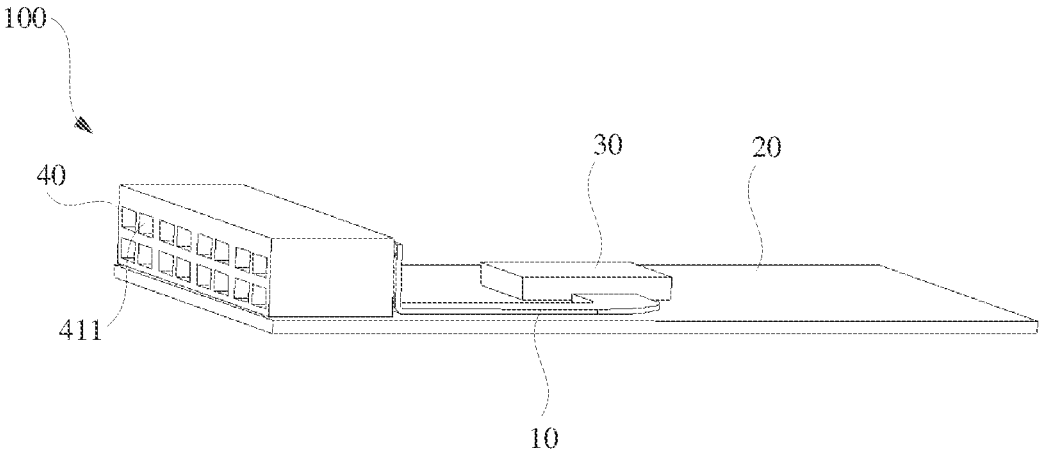
FIG. 2 is a schematic diagram of a structure of a service board according to an embodiment of this disclosure.

As shown in FIG. 2, the service board 100 includes a flexible board 10, a first printed board 20, at least one chip 30, and at least one optical cage layer. Both the chip 30 and the optical cage layer may be located on the first printed board 20, the optical cage layer may be disposed on one side of the first printed board 20 and located at an edge of the first printed board 20, and an end face that is of the optical cage 40 and that is for insertion of the optical module 200 is a panel side of the service board 100.

The first printed board 20 may be a printed circuit board (PCB), and serves as a support for the entire service board. The flexible board 10 may be a flexible printed circuit board made of a polyimide or polyester film as a base material, and has features including high wiring density, a light weight, a thin thickness, and the like.

In this embodiment of this disclosure, an example in which the service board 100 includes a plurality of optical cage layers is used. Each optical cage layer includes a plurality of optical cages 40, and one optical module 200 is correspondingly inserted into an opening 411 that is of each optical cage 40 and that faces the panel side, so that the optical module 200 is electrically connected to the optical cage 40, and a signal may be transmitted from the optical module 200 to the optical cage 40.

Figure 3:
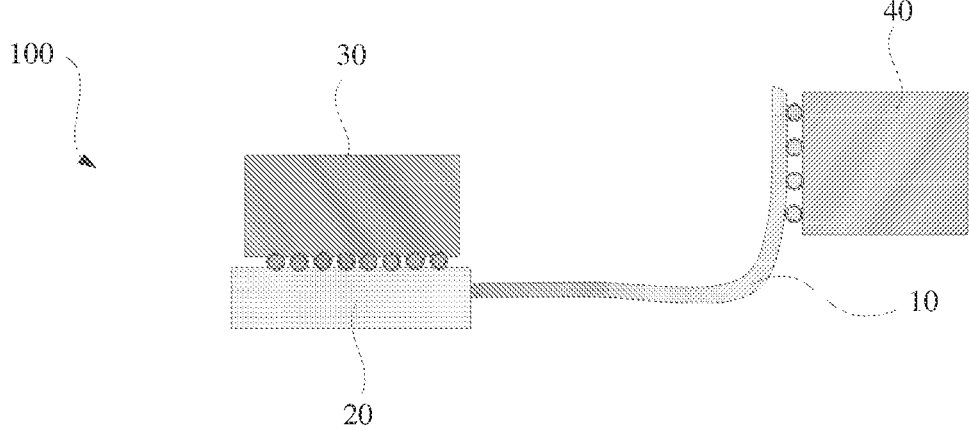
FIG. 3 is a schematic diagram of a connection between an optical cage and a chip on a service board according to an embodiment of this disclosure.
Figure 6:
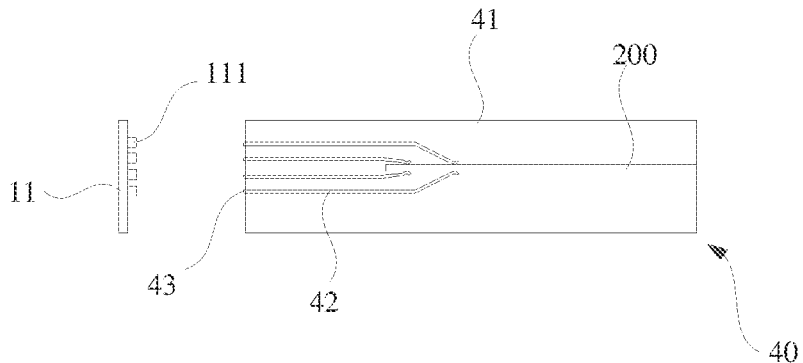
FIG. 6 is a schematic cross-sectional diagram of a structure of an optical cage that is inserted with an optical module and that is before being connected to a flexible board according to an embodiment of this disclosure.

With reference to FIG. 3, one end of the flexible board 10 is electrically connected to the optical cage 40. Specifically, the optical cage 40 may include a housing 41 and a plurality of signal pins 42 (as shown in FIG. 6), and one end of the flexible board 10 may be electrically connected to tail ends of the plurality of signal pins 42, so that an electrical connection between the optical cage 40 and the flexible board 10 is implemented, and a signal may be transferred from the optical cage 40 to the flexible board 10. The tail ends of the plurality of signal pins 42 are ends that are of the plurality of signal pins 42 and that are away from the opening 411 of the optical cage 40. Another end of the flexible board 10 is electrically connected to one chip 30, so that a signal is transferred from the flexible board 10 to the chip 30, to process a data signal.

In this way, an electrical connection between the chip 30 and the optical cage 40 can be implemented by using the flexible board 10, that is, an electrical connection between the chip 30 and the optical module 200 is implemented, so that a signal may be transmitted from the optical module 200 to the chip 30 of the service board 100, to implement signal transmission and processing. The tail ends of the plurality of signal pins 42 of the optical cage 40 are directly connected to a chip side of the flexible board 10 to implement an electrical connection. Compared with an existing optical cage 40 that is electrically connected to a printed circuit board on a chip side by using a connector, a vertical connection path can be avoided, a link length can be shortened, an insertion loss and crosstalk can be reduced, and the service board 100 is more applicable to a high-speed transmission scenario.

In addition, the flexible board 10 has high wiring density, a soft overall structure feature, and good bending performance, and can be bent and twisted at an arbitrary angle. Therefore, a non-coplanar connection between a plurality of layers of optical cages 40 and the chip 30 is implemented, integration of the service board is improved, assembly is convenient, introduction of problems including a large matching height, volume, and occupied space, and the like is reduced, a link insertion loss and crosstalk are reduced, and a high-density connection and a simplified design of the service board 100 are implemented, so that the service board 100 can be better applicable to a high-density high-speed transmission scenario.

Figure 4:
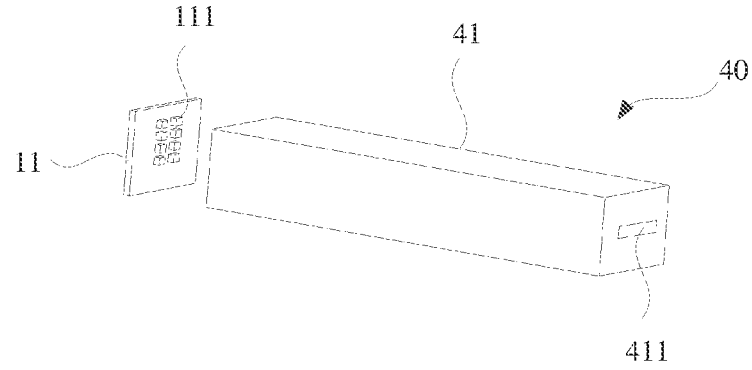
FIG. 4 is a schematic diagram of a structure of an optical cage before being connected to a flexible board according to an embodiment of this disclosure.

As shown in FIG. 4, the opening 411 for insertion of the optical module is disposed on the housing 41 of the optical cage 40. With reference to FIG. 6, head ends (ends opposite to the tail ends) of the plurality of signal pins 42 may be located inside the opening 411, and are electrically connected to the optical module 200 inserted into the opening 411. Specifically, for example, the head ends of the plurality of signal pins 42 may form a claw-shaped structure, and after the optical module 200 is inserted into the opening 411, the optical module 200 may be inserted into the claw-shaped structure, and is clamped and in contact with the plurality of signal pins 42 to implement an electrical connection, so that an electrical connection between the optical module 200 and the optical cage 40 is implemented.

With reference to the accompanying drawings and specific implementations, the following describes in detail a manner of connecting the optical cage to the flexible board.

The tail ends of the plurality of signal pins 42 of the optical cage 40 may all extend from a tail end of the housing 41, so that the flexible board 10 is electrically connected to the tail ends of the plurality of signal pins 42, and an electrical connection between the flexible board 10 and the optical cage 40 is implemented.

Figure 5:
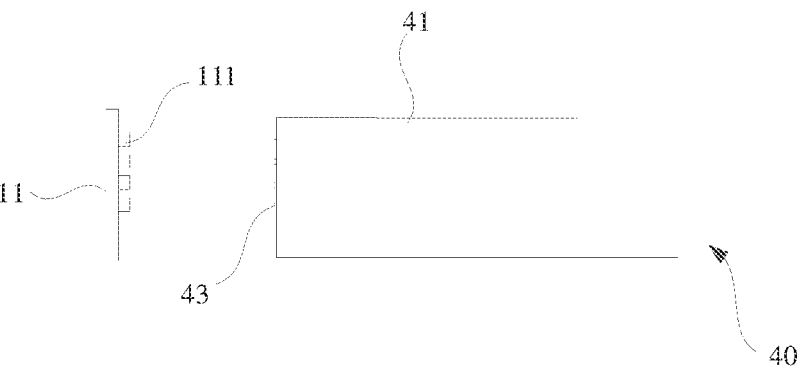
FIG. 5 is a schematic diagram of a structure of an optical cage that is inserted with an optical module and that is before being connected to a flexible board according to an embodiment of this disclosure.

Specifically, in a possible implementation, as shown in FIG. 5 and FIG. 6, the tail ends of the plurality of signal pins 42 all extend from the tail end of the housing 41, and the tail ends of the plurality of signal pins 42 are first bump structures 43.

The flexible board 10 has a connection part 11, a first surface of the connection part 11 faces the tail end of the housing 41, a plurality of second bump structures 111 are disposed on a plate surface of the connection part 11, the plurality of second bump structures 111 are in contact with corresponding tail ends of the plurality of signal pins 42 of the optical cage 40, and an electrical connection is implemented. That is, the plurality of second bump structures 111 are in contact with a plurality of corresponding first bump structures 43, and an electrical connection between the second bump structure 111 and the first bump structure 43 is implemented. For example, hard contact between the first bump structure 43 and the second bump structure 111 is implemented, so that the first bump structure 43 and the second bump structure 111 are electrically connected, and an electrical connection between the flexible board 10 and the optical cage 40 is implemented. A connection manner is simple and easy to implement.

The tail ends of the plurality of signal pins 42 may extend out of the housing 41 for approximately 1 mm to form the first bump structures 43, that is, the first bump structure 43 may be a part of the signal pin 42. The second bump structure 111 may be formed by a plurality of protruding solder pads on the flexible board 10. A shape of the solder pad may be a rectangle, a length of the solder pad may be approximately 0.5 mm, and a width of the solder pad may be approximately 0.6 mm. Alternatively, a shape of the solder pad may be a circle, and a diameter of the solder pad may be approximately 0.6 mm.

A surface of the second bump structure 111 may be plated with a metal layer, for example, processed by using a processing technology including gold plating, silver plating, or the like. In this way, corrosion on the surface of the second bump structure 111 may be prevented, which may otherwise affect reliability of the first bump structure 43 and the second bump structure 111, so that reliability of an electrical connection between the flexible board 10 and the optical cage 40 is ensured, and stability and quality of signal transmission are improved.

The plurality of signal pins 42 may be metal conductor components and have specific elastic deformation. In this way, when the first bump structure 43 abuts against and is in contact with the second bump structure 111, the signal pins 42 may be compressed to generate specific elastic deformation. This helps improve contact fastness between the first bump structure 43 and the second bump structure 111, and ensures connection reliability of the first bump structure 43 and the second bump structure 111, so that reliability of an electrical connection between the optical cage 40 and the flexible board 10 is ensured, and stability and quality of signal transmission are improved.

Figure 7:
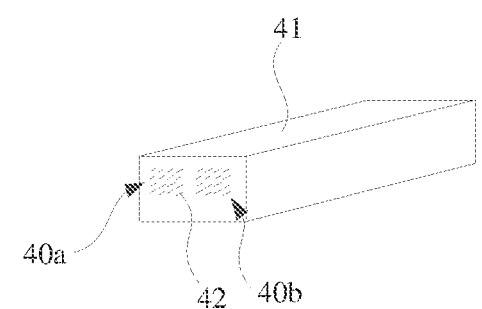
FIG. 7 is a schematic diagram of a structure of an optical cage according to an embodiment of this disclosure.

It should be understood that the optical module 200 has a signal transmit end (TX) and a signal receive end (RX). Therefore, as shown in FIG. 7, when the plurality of signal pins 42 extend from the tail end of the housing 41, the plurality of signal pins 42 may include a first signal pin array 40a and a second signal pin array 40b. The first signal pin array 40a is configured to send a signal to the chip 30, and the second signal pin array 40b is configured to receive a signal from the chip 30.

Figure 8:
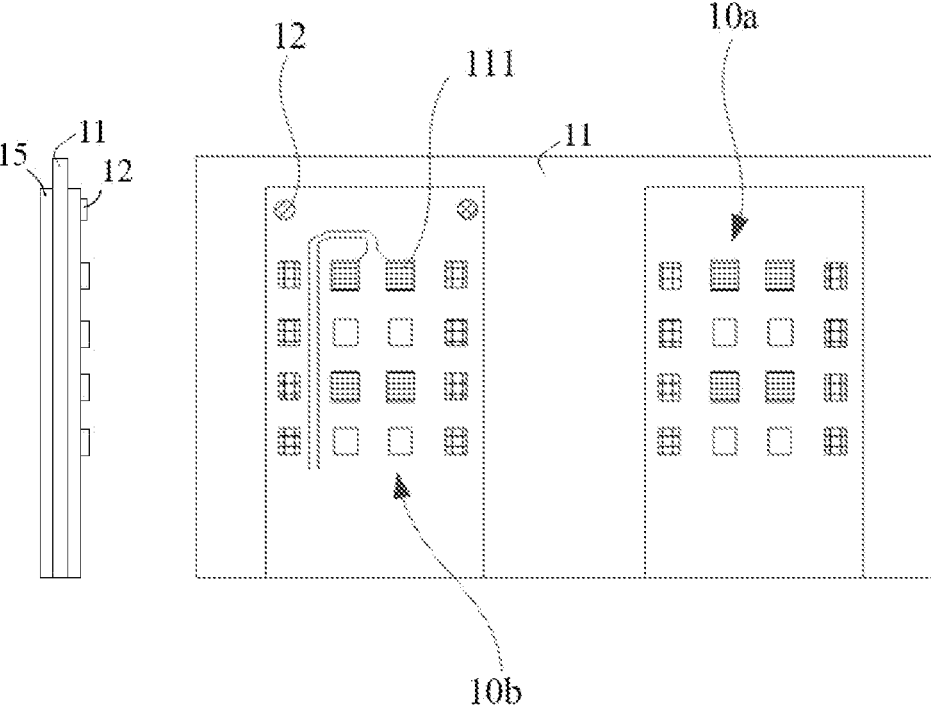
FIG. 8 is a schematic diagram of a structure of a first connection part of a flexible board according to an embodiment of this disclosure.

Correspondingly, as shown in FIG. 8, on the connection part 11 of the flexible board the plurality of second bump structures 111 may include a first bump array 10a and a second bump array 10b, where the first bump array 10a corresponds to and is electrically connected to the first signal pin array 40a, and the second bump array 10b corresponds to and is electrically connected to the second signal pin array 40b. The first signal pin array 40a may be electrically connected to the signal transmit end of the optical module 200, in this way, a signal on the optical module 200 may be transmitted to the first bump array 10a of the flexible board 10 by using the first signal pin array 40a of the optical cage 40. The second signal pin array 40b may be electrically connected to the signal receive end of the optical module 200, and a signal may also be sent from the second bump array 10b of the flexible board 10 to the second signal pin array 40b of the optical cage 40, and sent to the optical module 200, so that signal transmission between the optical module 200 and the chip 30 is implemented.

The flexible board 10 may be a three-layer board structure, and a signal layer is in the middle. A differential line is routed on the flexible board 10. One end of the differential line is electrically connected to the second bump structure 111, and another end of the differential line is configured to be electrically connected to the chip 30, to implement signal transmission between the optical cage 40 and the chip 30. As shown in FIG. 8, a distance between centers of two horizontally adjacent second bump structures may be approximately 1.0 mm, and a distance between centers of two vertically adjacent second bump structures is approximately 2.0 mm, to avoid signal interference between two signal transmission channels in a vertical direction.

The connection part 11 of the flexible board 10 may be fixedly connected to the tail end of the housing 41 of the optical cage 40, and the connection part 11 may be fastened to the tail end of the housing 41 in a manner of bonding, clamping, threaded connection, or the like. For example, the service board 100 may further include a locking structure, where the locking structure is configured to fasten the connection part and a corresponding tail end of the optical cage. As shown in FIG. 8, a mounting hole 12 may be disposed on the connection part 11, the locking structure may be a screw, a pin, or the like, and the mounting hole 12 may be a threaded hole or a through hole, so that the locking structure may be fixedly connected to the optical cage 40 through the mounting hole 12. In this way, the flexible board 10 and the optical cage 40 are connected and fastened by using the locking structure and the mounting hole 12.

When structural strength of the flexible board 10 is low, and the flexible board 10 is fixedly connected to the optical cage 40, the flexible board 10 is easily deformed, so that the second bump structure 111 of the flexible board 10 and the first bump structure 43 of the optical cage 40 are easily in poor contact, reducing reliability of an electrical connection.

In this embodiment of this disclosure, a reinforcing structure 15 is further disposed on a second surface of the connection part 11. The second surface is away from the first surface. The reinforcing structure 15 may be a reinforcing plate. When the connection part and the tail end of the optical cage are fastened by using the locking structure, the reinforcing structure 15, the connection part 11, and the tail end of the housing 41 of the optical cage 40 may also be fastened by using the locking structure. Strength of the flexible board 10 can be improved by using the reinforcing structure 15, to ensure contact fastness between the second bump structure 111 and the first bump structure 43 after the flexible board 10 is fixedly connected to the optical cage 40, and improve stability and quality of signal transmission.

It should be understood that the reinforcing structure may be selected and set based on structural strength of the flexible board. For example, when the structural strength of the flexible board 10 is good, the reinforcing structure may not be set.

Figure 9:
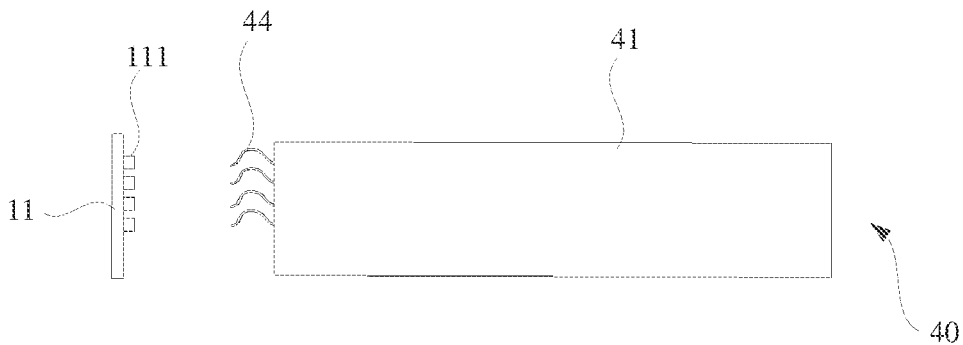
FIG. 9 is a schematic diagram of a structure of an optical cage before being connected to a flexible board according to an embodiment of this disclosure.

In another possible implementation, as shown in FIG. 9, the tail ends of the plurality of signal pins 42 all extend from the tail end of the housing 41, and a tail end of each signal pin 42 in the plurality of signal pins 42 is a spring contact structure 44. That is, the tail end of each signal pin 42 has a spring contact structure 44, a plurality of second bump structures 111 are disposed on a plate surface of the connection part 11 of the flexible board 10, and the plurality of second bump structures 111 may be in contact with a plurality of corresponding spring contact structures 44. In addition, an electrical connection between the second bump structure 111 and the spring contact structure 44 is implemented, so that an electrical connection between the flexible board 10 and the optical cage 40 is implemented.

When the spring contact structure 44 is in contact with the second bump structure 111, because the spring contact structure 44 is elastic, the spring contact structure 44 may be compressed to generate elastic deformation. When the flexible board 10 is locked and fastened to the tail end of the housing 41, and the second bump structure 111 abuts against and is electrically connected to the spring contact structure 44, the second bump structure 111 may press the spring contact structure 44, to make the spring contact structure 44 in an elastic contracting state. The contracted spring contact structure 44 has an elastic recovery force that may react on the second bump structure 111, to make contact between the spring contact structure 44 and the second bump structure 111 more secure, so that reliability of an electrical connection between the spring contact structure 44 and the second bump structure 111 is improved, reliability of an electrical connection between the optical cage 40 and the flexible board 10 is ensured, and stability and quality of signal transmission are improved.

Figure 10:
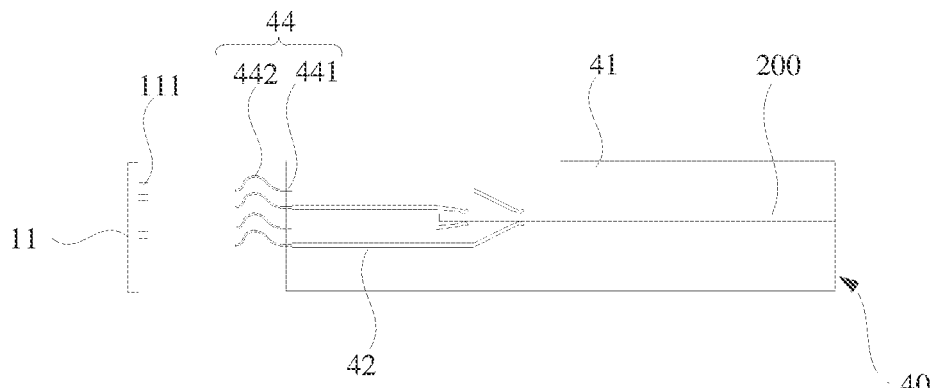
FIG. 10 is a schematic cross-sectional diagram of a structure of an optical cage that is inserted with an optical module and that is before being connected to a flexible board according to an embodiment of this disclosure.

As shown in FIG. 10, the spring contact structure 44 may include a body end 441 and a bent end 442 connected to the body end 441. The body ends 441 are fastened and electrically connected to a plurality of corresponding signal pins 42. At least a part of the bent end 442 extends out of the housing 41. The second bump structure 111 is in electrical contact with the bent end 442. Specifically, the spring contact structure 44 may extend out of the housing 41 for approximately 1 mm.

The spring contact structure 44 may be a metal conductor component, and the bent end 442 formed after bending has large elastic deformation, so that when the second bump structure 111 is in contact with the spring contact structure 44, the bent end 442 may be pressed to make the spring contact structure 44 deform and contract, thereby ensuring reliability of an electrical connection between the second bump structure 111 and the spring contact structure 44.

Figure 11:
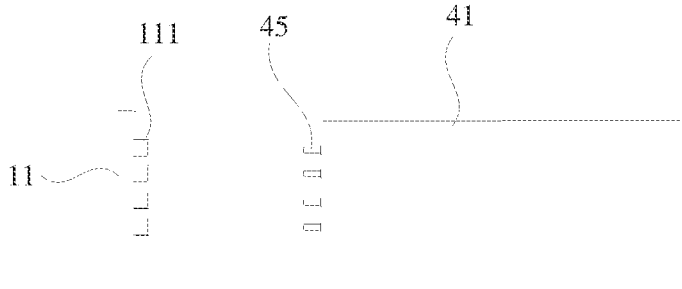
FIG. 11 is another schematic diagram of a structure of an optical cage before being connected to a flexible board according to an embodiment of this disclosure.

In still another possible implementation, as shown in FIG. 11, the tail ends of the plurality of signal pins 42 all extend from the tail end of the housing 41, and a tail end of each signal pin 42 is an elastic pin. As shown in FIG. 11, the tail end of each signal pin 42 has an elastic pin 45, a plurality of second bump structures 111 are disposed on a plate surface of the connection part 11 of the flexible board 10, and the plurality of second bump structures 111 may be in contact with a plurality of corresponding elastic pins 45. In addition, an electrical connection between the second bump structure 111 and the elastic pin 45 is implemented, so that an electrical connection between the flexible board 10 and the optical cage 40 is implemented.

Figure 12:
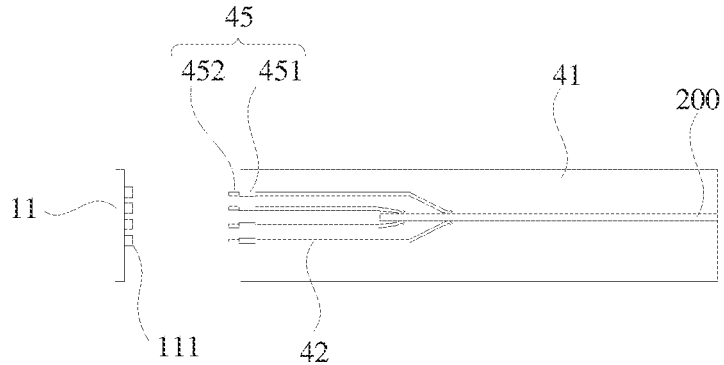
FIG. 12 is another schematic cross-sectional diagram of a structure of an optical cage that is inserted with an optical module and that is before being connected to a flexible board according to an embodiment of this disclosure.

As shown in FIG. 12, the elastic pin 45 is an expandable elastic component having a spring, and may include an outer tube 451 and an inner tube 452 sleeved inside the outer tube 451. One end of the inner tube 452 extends out of the outer tube 451, and another end of the inner tube 452 is connected to the outer tube 451 by using a spring component, so that the inner tube 452 may slide relatively along an axis direction of the outer tube 451. In this way, the inner tube 452 may move towards or away from the spring component, that is, the inner tube 452 undergoes axial telescopic movement relative to the outer tube 451.

At least a part of the inner tube 452 may extend out of the housing 41. Specifically, the elastic pin 45 may extend out of the housing 41 for approximately 0.5 mm. For example, when the inner tube 452 completely extends relative to the outer tube 451, the inner tube 452 may extend out of the housing 41 for approximately 0.5 mm. The second bump structure 111 may be in electrical contact with the inner tube 452. When the second bump structure 111 abuts against and is in contact with the inner tube 452, the inner tube 452 may be pushed to move towards the spring component, so that the spring component is compressed, and an elastic recovery force of the spring component may react on the second bump structure 111, thereby ensuring reliability of an electrical connection between the second bump structure 111 and the elastic pin 45.

Figure 13:
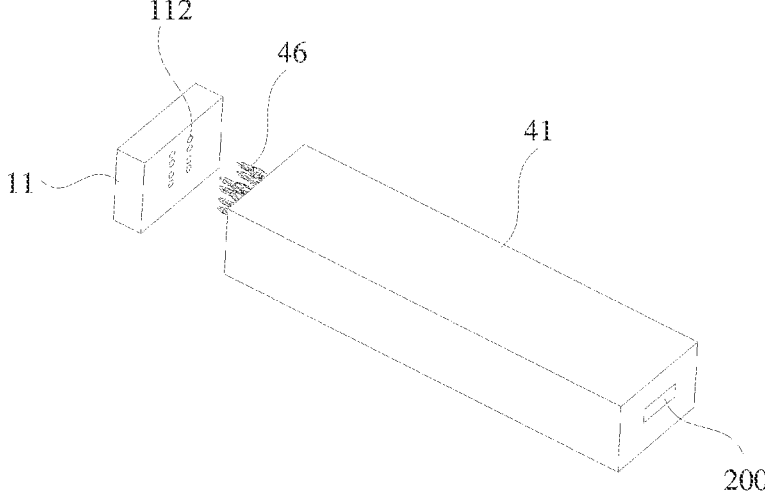
FIG. 13 is another schematic diagram of a structure of an optical cage before being connected to a flexible board according to an embodiment of this disclosure.
Figure 14:
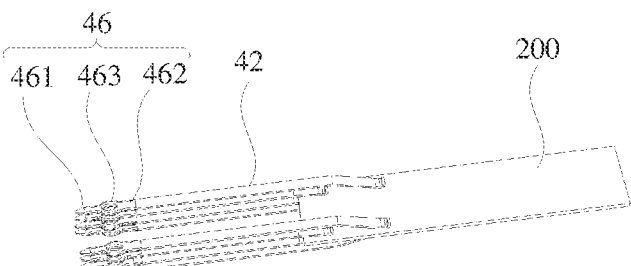
FIG. 14 is another schematic cross-sectional diagram of a structure of an optical cage that is inserted with an optical module and that is before being connected to a flexible board according to an embodiment of this disclosure.

In still another possible implementation, with reference to FIG. 13 and FIG. 14, a plurality of signal via holes 112 may be disposed on a plate surface of the connection part 11, the tail ends of the plurality of signal pins 42 all extend from the housing 41, and a tail end of each signal pin in the plurality of signal pins 42 may be a fisheye structure. That is, the tail end of each signal pin 42 has a fisheye structure 46, and a plurality of fisheye structures 46 are pressed into the plurality of signal via holes 112 in a one-to-one correspondence manner, the fisheye structure 46 abuts against and is in contact with an inner wall of the signal via hole 112, and an electrical connection between the fisheye structure 46 and the signal via hole 112 is implemented, so that an electrical connection between the flexible board 10 and the optical cage 40 is implemented.

The fisheye structure 46 is a connection structure having an elastic crimping part. The fisheye structure 46 is pressed into the signal via hole 112, so that the fisheye structure 46 is connected to the signal via hole 112, and assembly is convenient. In addition, for the fisheye structure 46 pressed into the signal via hole 112, a rebound force generated by compressing the elastic crimping part of the fisheye structure 46 acts on the signal via hole 112, so that reliability of an electrical connection between the fisheye structure 46 and the signal via hole 112 can be ensured, that is, reliability of an electrical connection between the flexible board 10 and the optical cage 40 is ensured.

Specifically, the elastic crimping part may be an elastic crimping ring. As shown in FIG. 14, the fisheye structure 46 may include an insertion end 461, a connection end 462, and an elastic crimping ring 463. The elastic crimping ring 463 is located between the insertion end 461 and the connection end 462. The elastic crimping ring 463 is separately connected to the insertion end 461 and the connection end 462, and the elastic crimping ring 463 may undergo radial elastic contraction deformation. At least the insertion end 461 and the elastic crimping ring 463 extend out of the housing 41, and the connection end 462 may partially extend out of the housing 41. Specifically, the fisheye structure 46 may extend out of the housing 41 for approximately 1 mm.

The connection ends 462 are connected to a plurality of corresponding signal pins 42, so that the fisheye structure 46 is electrically connected to a corresponding signal pin 42. With reference to FIG. 13, the insertion end 461 and the elastic crimping ring 463 may extend into the signal via hole 112, and after the elastic crimping ring 463 extends into the electrical connection via hole, the elastic crimping ring 463 is pressed into an elastic contracting state, and an outer wall of the elastic crimping ring 463 abuts against and is in contact with an inner wall of the signal via hole 112, so that the fisheye structure 46 is electrically connected to the signal via hole 112.

In addition, because the elastic crimping ring 463 is in an elastic contracting state, an elastic recovery force of the elastic crimping ring 463 reacts on the signal via hole 112, so that the elastic crimping ring 463 is clamped in the signal via hole 112, and reliability of an electrical connection between the flexible board 10 and the optical cage 40 is ensured.

Both a cross-sectional width of the insertion end 461 and an aperture size of the signal via hole 112 may be less than an outer diameter width of the elastic crimping ring 463. In this way, the elastic crimping ring 463 may be in an elastic contracting state after extending into the signal via hole 112.

As shown in FIG. 14, a cross-sectional width of an end that is of the insertion end 461 and that is away from the elastic crimping ring 463 may gradually increase in a direction towards the elastic crimping ring 463, so that an end that is of the insertion end 461 and that is away from the elastic crimping ring 463 is in a shape of a tip. In this way, the insertion end 461 may play a transition role, the elastic crimping ring 463 may be easily pressed into the signal via hole 112, so that an electrical connection between the fisheye structure 46 and the signal via hole 112 is implemented, and assembly is convenient.

In this embodiment of this disclosure, the tail ends of the plurality of signal pins 42 extend from the tail end of the housing 41, and a plurality of second bump structures 111 or signal via holes 112 are disposed on the connection part 11 of the flexible board 10. The tail ends of the plurality of signal pins 42 are connected to the second bump structures 111 or the signal via holes 112 to implement an electrical connection between the flexible board 10 and the optical cage 40, and the signal pin 42 extending out of the tail end of the optical cage 40 is in a direct electrical connection to the connection part 11 of the flexible board 10, so that a vertical connection path can be avoided, and an insertion loss and crosstalk are reduced.

In addition, the plurality of signal pins 42 are in direct contact with corresponding second bump structures 111, or the plurality of signal pins 42 may be pressed into corresponding signal via holes 112 to implement an electrical connection. This manner has high detachability, is easy to implement decoupling between the optical cage 40 and the flexible board 10, and is convenient for assembly, disassembly, and replacement.

Figure 15:
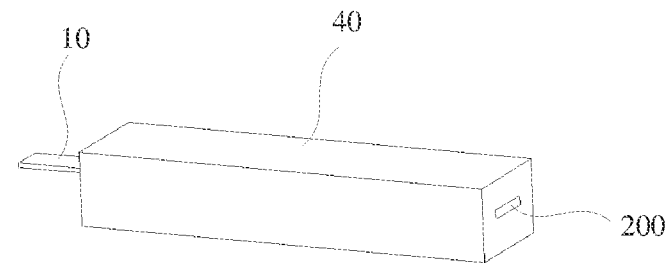
FIG. 15 is another schematic diagram of a structure of a connection between an optical cage and a flexible board according to an embodiment of this disclosure.
Figure 16:
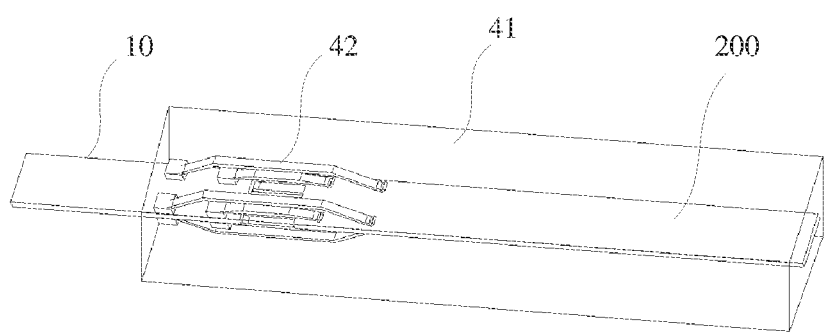
FIG. 16 is another schematic cross-sectional diagram of a structure of a connection between an optical cage inserted with an optical module and a flexible board according to an embodiment of this disclosure.

The tail ends of the plurality of signal pins 42 of the optical cage 40 may also be located inside the housing 41. As shown in FIG. 15 and FIG. 16, the flexible board 10 may extend into the housing 41 from the tail end of the housing 41 of the optical cage 40, and is electrically connected to the tail ends of the plurality of signal pins 42, to implement an electrical connection between the flexible board 10 and the optical cage 40. In this way, the flexible board 10 and the optical cage 40 have better connection fastness, strength of an electrical connection between the flexible board 10 and the optical cage 40 is increased, connection reliability is improved, and signal transmission stability and quality are improved. In addition, a path between the signal pin 42 and the flexible board 10 may be further shortened, and a link loss and crosstalk may be further reduced.

The flexible board 10 may be integrally formed with the optical cage 40, and specifically, may be formed in a manner of two-shot injection molding. In a first molding injection, the plurality of signal pins 42 are pre-positioned, and the plurality of signal pins 42 and the flexible board 10 are fastened together in a manner of soldering a solder pad, and then a second molding injection is performed, to integrally form the plurality of signal pins 42, the flexible board 10, and the housing 41.

With reference to the accompanying drawings and specific implementations, the following describes in detail a manner of connecting the flexible board to the chip.

Figure 17:
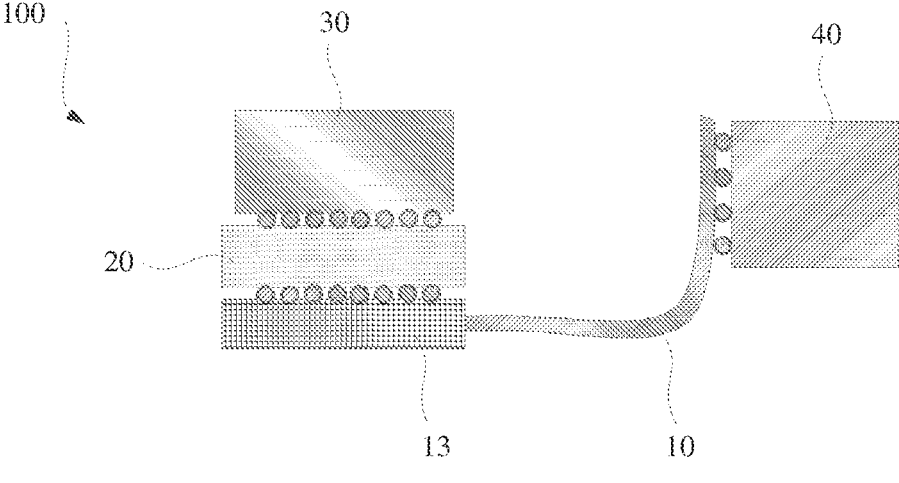
FIG. 17 is another schematic diagram of a structure of a connection between an optical cage and a chip on a service board according to an embodiment of this disclosure.

In this embodiment of this disclosure, as shown in FIG. 17, at least one chip 30 is disposed on the first printed board 20, and is electrically connected to the first printed board 20.

In a possible implementation, the flexible board 10 may be electrically connected to the first printed board 20.

Specifically, for example, at least one flexible board 10 may be disposed on the first printed board 20. As shown in FIG. 17, the at least one flexible board 10 is fastened to the first printed board 20 by using a combination part 13. The combination part 13 may be disposed on the first printed board 20 in a manner of welding, crimping, bumping, spring contact, or a socket connection.

Figure 18:
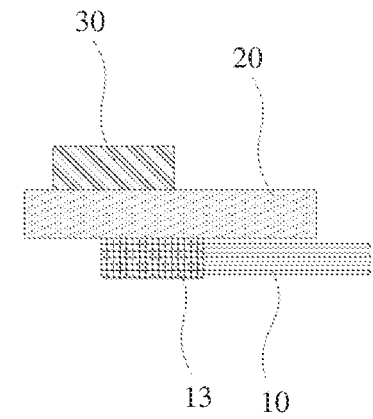
FIG. 18 is a schematic diagram of a structure of a connection between a first printed board and a flexible board according to an embodiment of this disclosure.

Specifically, as shown in FIG. 18, the at least one chip 30 and the at least one flexible board 10 may be located on two sides of the first printed board 20, for example, may be respectively located on two opposite sides of the first printed board 20. The at least one flexible board 10 may be located right below or obliquely below the at least one chip 30.

Figure 19:
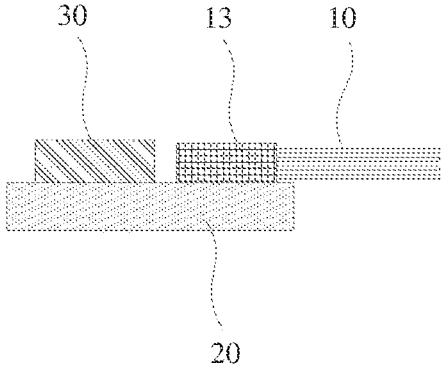
FIG. 19 is another schematic diagram of a structure of a connection between a first printed board and a flexible board according to an embodiment of this disclosure.

As shown in FIG. 19, the at least one chip 30 and the at least one flexible board 10 may be located on a same side of the first printed board 20, and this facilitates connection and also helps reduce a matching height of the service board 100.

The at least one flexible board may include only one flexible board 10, or may include a plurality of flexible boards 10. When the at least one flexible board is one flexible board 10, the combination part 13 is a part of the flexible board 10, the flexible board 10 is electrically connected to the first printed board 20, and the first printed board 20 is electrically connected to the chip 30, so that an electrical connection between the flexible board 10 and the chip 30 is implemented, that is, an electrical connection between the optical cage 40 and the chip 30 is implemented by using the flexible board 10.

In this case, a reinforcing structure may be disposed on a side that is of the combination part 13 and that is opposite to the first printed board 20, and strength of the flexible board 10 may be improved by using the reinforcing structure, to ensure connection fastness between the flexible board 10 and the first printed board 20.

When the at least one flexible board includes a plurality of flexible boards 10, the combination part 13 includes a part of each flexible board 10 in a plurality of flexible boards, that is, each flexible board 10 undergoes mixed pressing to form the combination part 13, and the combination part 13 is electrically connected to the first printed board 20, to implement an electrical connection between the flexible board 10 and the chip 30.

In addition, when the at least one flexible board includes a plurality of flexible boards 10, a gap may exist between at least a part of two adjacent flexible boards 10. In this way, the flexible board 10 meets a high-density connection requirement, and the gap between the flexible boards 10 may facilitate bending of the flexible boards 10. This helps further reduce a volume and occupied space of the service board 100, reduce wind resistance, and further improve performance of the service board 100.

The combination part 13 may be a rigid-flex board formed after the flexible board 10 undergoes mixed pressing with a part of a hard board, so that the combination part 13 has high strength, reliability of a connection between the flexible board 10 and the chip 30 is improved, and stability and quality of signal transmission are improved. Correspondingly, the connection part 11 of the flexible board 10 may also be a rigid-flex board, to further improve connection fastness between the flexible board 10 and the optical cage 40.

Figure 20:
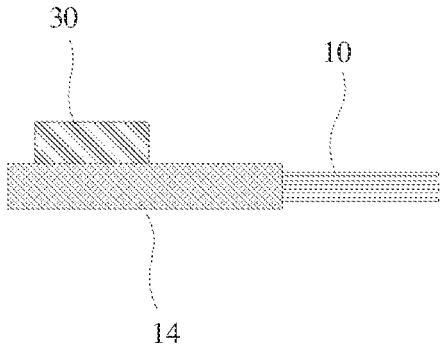
FIG. 20 is another schematic diagram of a structure of a connection between a first printed board and a flexible board according to an embodiment of this disclosure.

Alternatively, as shown in FIG. 20, the first printed board 20 may include a flexible and rigid combination area 14, a part of the first printed board 20 and a part of the at least one flexible board 10 are laminated to form the flexible and rigid combination area 14, and the at least one flexible board 10 is electrically connected to the first printed board 20. That is, a part of the at least one flexible board 10 is integrated with a part of the first printed board 20 through mixed pressing, and the at least one flexible board 10 is electrically connected to the first printed board so that the flexible board 10 is electrically connected to the chip 30.

The flexible and rigid combination area 14 is formed through mixed pressing, so that fastening and an electrical connection between the at least one flexible board 10 and the first printed board 20 are implemented, connection fastness between the flexible board 10 and the first printed board 20 is ensured, and stability and quality of signal transmission are improved.

In another possible implementation, the flexible board 10 may be electrically connected to a second printed board 32 of the at least one chip 30.

Figure 21:
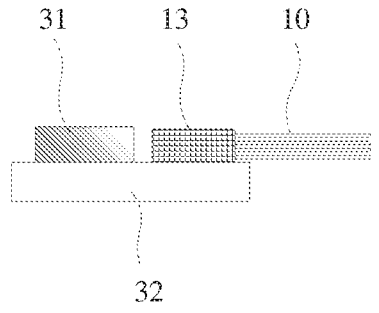
FIG. 21 is a schematic diagram of a structure of a connection between a second printed board and a flexible board according to an embodiment of this disclosure.

Specifically, as shown in FIG. 21, the at least one chip 30 may include at least one chip component 31 and the second printed board 32. The second printed board 32 is configured to package the at least one chip component 31. The second printed board 32 may be disposed on the first printed board 20. The chip component 31 is electrically connected to the second printed board 32, to implement an electrical connection between the chip component 31 and an external circuit.

At least one flexible board 10 may be disposed on the second printed board 32, and the at least one flexible board 10 is fastened to the second printed board 32 by using the combination part 13. Specifically, as shown in FIG. 21, the at least one chip component and the at least one flexible board are located on a same side of the first printed board.

The combination part 13 may be disposed on the second printed board 32 through welding, bumping, or a spring contact connection.

Specifically, the at least one flexible board may include only one flexible board 10, the combination part 13 is a part of the flexible board 10, and the flexible board 10 is electrically connected to the second printed board 32, so that the chip component 31 is electrically connected to the flexible board 10, an electrical connection between the chip 30 and the optical module 200 is implemented, and signal transmission between the optical module 200 and the chip 30 is enabled.

In this case, a reinforcing structure may be disposed on a side that is of the combination part 13 and that is opposite to the second printed board 32, so that strength of the flexible board may be improved, connection fastness between the flexible board 10 and the second printed board 32 may be ensured, and stability and quality of signal transmission may be improved.

As shown in FIG. 21, the at least one flexible board may also include a plurality of flexible boards 10, the combination part 13 includes a part of each flexible board 10 in the plurality of flexible boards 10, and the combination part 13 is electrically connected to the second printed board 32, so that an electrical connection between the chip 30 and the flexible board 10 is implemented.

Figure 22:
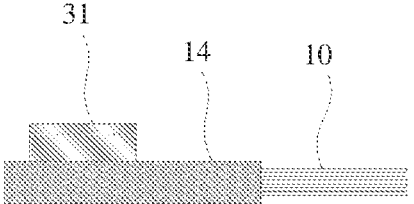
FIG. 22 is another schematic diagram of a structure of a connection between a second printed board and a flexible board according to an embodiment of this disclosure.

Alternatively, as shown in FIG. 22, the second printed board 32 may include a flexible and rigid combination area 14, a part of the second printed board 32 and a part of the at least one flexible board 10 are laminated to form the flexible and rigid combination area 14, and the at least one flexible board 10 is electrically connected to the second printed board 32. That is, a part of the at least one flexible board 10 is integrated with a part of the second printed board 32 through mixed pressing, and the at least one flexible board 10 is electrically connected to the second printed board 32, so that the flexible board 10 is electrically connected to the chip 30.

In this way, the flexible and rigid combination area 14 is formed through mixed pressing, so that fastening and an electrical connection between the at least one flexible board 10 and the second printed board 32 are implemented, connection fastness between the flexible board 10 and the second printed board 32 is ensured, and stability and quality of signal transmission are improved.

In this embodiment of this disclosure, the flexible board 10 is in a direct electrical connection to the second printed board 32 of the chip 30. Compared with implementing an electrical connection to the chip 30 by using the first printed board 20, this can further reduce a link loss and crosstalk, and help improve performance of the service board 100.

In the descriptions of embodiments of this disclosure, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship of two elements. A person of ordinary skill in the art can understand specific meanings of these terms in embodiments of this disclosure based on specific situations.

In this specification of embodiments of this disclosure, the terms "first", "second", "third", "fourth", and the like (if they exist) are intended to distinguish between similar objects but do not necessarily indicate a specific order or sequence.

Finally, it should be noted that the foregoing embodiments are merely intended for describing the technical solutions of embodiments of this disclosure other than limiting embodiments of this disclosure. Although embodiments of this disclosure are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this disclosure.

What is claimed is:

1. A service board comprising:

a first printed board, at least one chip, and at least one optical cage layer, wherein:

the at least one chip is disposed on the first printed board, each optical cage layer comprises a plurality of optical cages, each of the optical cages has an opening facing a panel side, and the opening is configured for insertion of one optical module; and the service board further comprises a flexible board, each of the optical cages comprises a housing and a plurality of signal pins, one end of the flexible board is electrically connected to ends of the plurality of signal pins, another end of the flexible board is electrically connected to the at least one chip, and the ends of the plurality of signal pins are away from the opening of each of the optical cages, wherein the ends of the plurality of signal pins all extend from an end of the housing, the plurality of signal pins comprise a first signal pin array and a second signal pin array, the first signal pin array is configured to send a signal to the chip, and the second signal pin array is configured to receive another signal from the chip.

2. The service board according to claim 1, wherein each of the ends of the plurality of signal pins is a first bump structure.

3. The service board according to claim 2, wherein the flexible board has a connection part, a first surface of the connection part faces the end of the housing, a plurality of second bump structures are disposed on a plate surface of the connection part, the plurality of second bump structures are in contact with corresponding ends of the plurality of signal pins so that an electrical connection is implemented.

4. The service board according to claim 1, wherein each of the ends of the plurality of signal pins is a spring contact structure.

5. The service board according to claim 1, wherein each of the ends of the plurality of signal pins is an elastic pin.

6. The service board according to claim 1, wherein each of the ends of the plurality of signal pins is a fisheye structure.

7. The service board according to claim 6, wherein the flexible board has a connection part, a first surface of the connection part faces the end of the housing, a plurality of signal via holes are disposed on a plate surface of the connection part, and a plurality of the fisheye structures are respectively pressed into the plurality of signal via holes in a one-to-one correspondence.

8. The service board according to claim 1, wherein the at least one chip is electrically connected to the first printed board, the flexible board includes at least one flexible board and the at least one flexible board is disposed on the first printed board, the at least one flexible board is fastened to the first printed board by using a combination part, and the at least one chip and the at least one flexible board are both located on a same side of the first printed board, or are respectively located on two sides of the first printed board; and when the at least one flexible board comprises only one flexible board, the combination part is a part of the only one flexible board, and the only one flexible board is electrically connected to the first printed board; or when the at least one flexible board comprises a plurality of flexible boards, the combination part comprises a part of each one of the plurality of flexible boards, and the combination part is electrically connected to the first printed board.

9. The service board according to claim 1, wherein the at least one chip is electrically connected to the first printed board, and the flexible board includes at least one flexible board and the at least one flexible board is disposed on the first printed board; and the first printed board comprises a flexible and rigid combination area, a part of the first printed board and a part of the at least one flexible board are laminated to form the flexible and rigid combination area, and the at least one flexible board is electrically connected to the first printed board.

10. The service board according to claim 1, wherein the at least one chip comprises at least one chip component, a second printed board is electrically connected to the at least one chip component, the second printed board is disposed on the first printed board, the flexible board includes at least one flexible board and the at least one flexible board is disposed on the second printed board, the at least one flexible board is fastened to the second printed board by using a combination part, and both the chip component and the at least one flexible board are located on a same side of the second printed board; and when the at least one flexible board comprises only one flexible board, the combination part is a part of the only one flexible board, and the only one flexible board is electrically connected to the second printed board; or when the at least one flexible board comprises a plurality of flexible boards, the combination part comprises a part of each one of the plurality of flexible boards, and the combination part is electrically connected to the second printed board.

11. The service board according to claim 1, wherein the at least one chip comprises at least one chip component, a second printed board is electrically connected to the at least one chip component, the second printed board is disposed on the first printed board, and the flexible board includes at least one flexible board and the at least one flexible board is disposed on the second printed board; and the second printed board comprises a flexible and rigid combination area, a part of the second printed board and a part of the at least one flexible board are laminated to form the flexible and rigid combination area, and the at least one flexible board is electrically connected to the second printed board.

12. A service board comprising:

a first printed board, at least one chip, and at least one optical cage layer, wherein:

the at least one chip is disposed on the first printed board, each optical cage layer comprises a plurality of optical cages, each of the optical cages has an opening facing a panel side, and the opening is configured for insertion of one optical module;

the service board further comprises a flexible board, each of the optical cages comprises a housing and a plurality of signal pins, one end of the flexible board is electrically connected to ends of the plurality of signal pins, another end of the flexible board is electrically connected to the at least one chip, and the ends of the plurality of signal pins are away from the opening of each of the optical cages;

the ends of the plurality of signal pins all extend from an end of the housing, and each of the ends of the plurality of signal pins is a first bump structure; and the flexible board has a connection part, a first surface of the connection part faces the end of the housing, a plurality of second bump structures are disposed on a plate surface of the connection part, the plurality of second bump structures are in contact with corresponding ends of the plurality of signal pins so that an electrical connection is implemented.

13. The service board according to claim 12, wherein a reinforcing structure is disposed on a second surface of the connection part, and the second surface is away from the first surface.

14. The service board according to claim 12, further comprising a locking structure configured to fasten the connection part and a corresponding end of the housing.

15. A communication device comprising:

a body; and a service board comprising a first printed board, at least one chip, and at least one optical cage layer, wherein:

the at least one chip is disposed on the first printed board, each optical cage layer comprises a plurality of optical cages, each of the optical cages has an opening facing a panel side, and the opening is configured for insertion of one optical module;

the service board further comprises a flexible board, each of the optical cages comprises a housing and a plurality of signal pins, one end of the flexible board is electrically connected to ends of the plurality of signal pins, another end of the flexible board is electrically connected to the at least one chip, and the ends of the plurality of signal pins are away from the opening of each of the optical cages, wherein the ends of the plurality of signal pins all extend from an end of the housing, the plurality of signal pins comprise a first signal pin array and a second signal pin array, the first signal pin array is configured to send a signal to the chip, and the second signal pin array is configured to receive another signal from the chip; and the body has a slot, and the service board is inserted into the slot.

16. The communication device according to claim 15, wherein each of the ends of the plurality of signal pins is a first bump structure.

17. The communication device according to claim 16, wherein the flexible board has a connection part, a first surface of the connection part faces the end of the housing, a plurality of second bump structures are disposed on a plate surface of the connection part, the plurality of second bump structures are in contact with corresponding ends of the plurality of signal pins so that an electrical connection is implemented.

18. The communication device according to claim 17, wherein a reinforcing structure is disposed on a second surface of the connection part, and the second surface is away from the first surface.

19. The communication device according to claim 15, wherein each of the ends of the plurality of signal pins in is a spring contact structure.

20. The communication device according to claim 15, wherein the ends of the plurality of signal pins all extend from an end of the housing, and each of the ends of the plurality of signal pins is an elastic pin.

* * * * *